(12) United States Patent
Suzuki

(10) Patent No.: US 9,877,005 B2
(45) Date of Patent: Jan. 23, 2018

(54) SOLID-STATE IMAGE-CAPTURING DEVICE WHICH REDUCES NUMBER OF SIGNAL CHANNELS

(71) Applicant: OLYMPUS CORPORATION, Hachioji-shi, Tokyo (JP)

(72) Inventor: Daisuke Suzuki, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/208,014

(22) Filed: Jul. 12, 2016

(65) Prior Publication Data
US 2016/0323555 A1 Nov. 3, 2016

Related U.S. Application Data

(63) Continuation of application No. PCT/JP2015/055723, filed on Feb. 26, 2015.

(30) Foreign Application Priority Data

Mar. 13, 2014 (JP) .................................. 2014-050420

(51) Int. Cl.
*H04N 5/225* (2006.01)
*H04N 9/64* (2006.01)
(Continued)

(52) U.S. Cl.
CPC ............... *H04N 9/646* (2013.01); *G06T 3/40* (2013.01); *H04N 5/2252* (2013.01);
(Continued)

(58) Field of Classification Search
CPC ...... H04N 5/2252; H04N 5/378; H04N 9/646; H04N 9/083; H04N 9/68; H04N 9/045; H04N 9/07; G06T 3/40
See application file for complete search history.

(56) References Cited

U.S. PATENT DOCUMENTS 8,223,219 B2 7/2012 Hatano
2007/0127095 A1* 6/2007 Sugimori ........... H04N 1/40068
358/520
(Continued)

FOREIGN PATENT DOCUMENTS

JP 2007006038 A 1/2007
JP 2007158509 A 6/2007
(Continued)

OTHER PUBLICATIONS

International Search Report (ISR) dated Apr. 14, 2015 issued in International Application No. PCT/JP2015/055723.

*Primary Examiner* — Christopher K Peterson
(74) *Attorney, Agent, or Firm* — Holtz, Holtz & Volek PC

(57) ABSTRACT

An original image is subjected to reduction processing while minimizing cutting of intrinsically-reproducible frequency bands. A solid-state image-capturing device is provided with: a photoelectric conversion unit that is formed by arraying pixels of a plurality of colors having predetermined color-array periodicity in two-dimensionally, vertically and horizontally; a pixel mixing and reading unit that mixes pixel signals obtained by the photoelectric conversion unit, in each of pixels of the same colors in an n×n (n denotes a desired integer of 2 or more) block, and that outputs multi-channel reduced image signals with a reduction ratio 1/n; and an inter-channel displacement correcting unit that corrects inter-channel displacements of the reduced image signals output by the pixel mixing and reading unit and that outputs corrected reduced image signals.

5 Claims, 10 Drawing Sheets

(51) Int. Cl.
  *H04N 9/083* (2006.01)
  *H04N 9/68* (2006.01)
  *H04N 9/04* (2006.01)
  *H04N 5/378* (2011.01)
  *H04N 9/07* (2006.01)
  *G06T 3/40* (2006.01)

(52) U.S. Cl.
  CPC ............ *H04N 5/378* (2013.01); *H04N 9/045* (2013.01); *H04N 9/07* (2013.01); *H04N 9/083* (2013.01); *H04N 9/68* (2013.01)

(56) References Cited

U.S. PATENT DOCUMENTS

2008/0193049 A1* 8/2008 Onomura ............ H04N 5/3458
  382/300
2015/0296193 A1* 10/2015 Cote ...................... H04N 9/646
  382/167

FOREIGN PATENT DOCUMENTS

| JP | 2008199177 A | 8/2008 |
|----|--------------|--------|
| JP | 5280448 B2 | 9/2013 |

* cited by examiner

4 : 2 : 2

4 : 2 : 0

SOLID-STATE IMAGE-CAPTURING DEVICE WHICH REDUCES NUMBER OF SIGNAL CHANNELS

CROSS-REFERENCE TO RELATED APPLICATIONS

This is a continuation of International Application PCT/JP2015/055723, with an international filing date of Feb. 26, 2015, which is hereby incorporated by reference herein in its entirety. This application claims the benefit of Japanese Patent Application No. 2014-050420, filed on Mar. 13, 2014, the content of which is incorporated herein by reference.

TECHNICAL FIELD

The present invention relates to a solid-state image-capturing device.

BACKGROUND ART

There is a conventionally known solid-state image-capturing device in which pixel data of an original image having a predetermined color array (hereinafter, also referred to as Bayer array since Bayer array is generally used) is subjected to filter processing in units of lines, thereby extracting two types of data, i.e., brightness data and color difference data, a band-limiting filter is independently applied to each of the extracted brightness data and color difference data to perform resizing, and then the original Bayer array is reconstructed so as to be reproduced (for example, see PTL 1). With this solid-state image-capturing device, a sense of resolution is maintained while reducing false signals, such as moire and false color, through the above-described processing.

CITATION LIST

Patent Literature

{PTL 1} Publication of Japanese Patent No. 5280448

SUMMARY OF INVENTION

Technical Problem

In the solid-state image-capturing device of PTL 1, the Bayer array is reconstructed after resizing, and thus there is a possibility that intrinsically-reproducible frequency bands are also cut.

FIG. 12 is a two-dimensional spatial-frequency coordinate system showing limited bands of a full-resolution Bayer image and a reduced Bayer image that is vertically and horizontally reduced to ½. Here, fs indicates the Nyquist frequency corresponding to a pixel pitch (sampling period) of a full-resolution image.

In FIG. 12, the reproduction band of a Bayer-array G signal is formed into a rhomboid shape in which reproduction band portions at 45° in diagonal directions are low compared with those in vertical and horizontal directions, and reproduction bands at 45° in the diagonal directions are cut. Furthermore, in the reproduction band of an R/B signal, although the reproduction band portions at 45° in the diagonal directions are the same as those of the G signal, reproduction band portions in the vertical and horizontal directions are half of those of the G signal, and intrinsically-reproducible frequency bands are significantly cut, compared with the G signal.

The present invention is to provide a solid-state image-capturing device capable of obtaining reduced full-color multi-channel signals while minimizing the cutting of intrinsically-reproducible frequency bands.

Solution to Problem

In order to achieve the above-described object, the present invention provides the following solutions.

According to one aspect, the present invention provides a solid-state image-capturing device including: a photoelectric conversion unit that is formed by arraying pixels of a plurality of colors having predetermined color-array periodicity in two-dimensionally, vertically and horizontally; a pixel mixing and reading unit that mixes pixel signals obtained by the photoelectric conversion unit, in each of pixels of the same colors in an n×n (n denotes a desired integer of 2 or more) block, and that outputs multi-channel reduced image signals with a reduction ratio 1/n; and an inter-channel displacement correcting unit that corrects inter-channel displacements of the reduced image signals output by the pixel mixing and reading unit and that outputs corrected reduced image signals.

In the above-described aspect, the photoelectric conversion unit may be formed by Bayer-arraying the pixels; the pixel mixing and reading unit may calculate the mixed pixel signals of the same colors as reduced image signals having coordinates located at center-of-gravity positions of the pixels of the same colors in the block; and the inter-channel displacement correcting unit may include a position-displacement correcting unit that corrects, when n is an even number, position displacements of the reduced image signals of the respective colors such that the coordinates of the reduced image signals are coincident with each other.

In the above-described aspect, the photoelectric conversion unit may be formed by Bayer-arraying the pixels; and the inter-channel displacement correcting unit may include a gain correcting unit that corrects, when n is an odd number, the difference in characteristics of the pixels of the same color between adjacent rows.

In the above-described aspect, the photoelectric conversion unit may be formed by Bayer-arraying the pixels; the pixel mixing and reading unit may calculate the mixed pixel signals of the same colors as reduced image signals having coordinates located at center-of-gravity positions of the pixels of the same colors in the block; and the inter-channel displacement correcting unit may include: a position-displacement correcting unit that corrects, when n is an even number, position displacements of the reduced image signals of the respective colors such that the coordinates of the reduced image signals are coincident with each other; and a gain correcting unit that corrects, when n is an odd number, the difference in characteristics of the pixels of the same color between adjacent rows.

Furthermore, in the above-described aspect, it is possible to further include: a color conversion unit that separates the multi-channel reduced image signals corrected by the inter-channel displacement correcting unit into a brightness signal and color-difference signals and that limits signal bands of the color-difference signals; and a pixel decimating unit that decimates the color-difference signals output from the color conversion unit.

In the above-described aspect, it is possible to further include a gradation conversion unit that performs gradation conversion on the multi-channel reduced image signals corrected by the inter-channel displacement correcting unit and that outputs image signals that are expressed by a bit width less than the bit width obtained after AD conversion.

Furthermore, according to another aspect, the present invention provides a solid-state image-capturing device including: a pixel mixing and reading unit that mixes pixel signals obtained by a photoelectric conversion unit formed by arraying pixels of a plurality of colors having predetermined color-array periodicity in two-dimensionally, vertically and horizontally, in each of pixels of the same colors in an n×n (n denotes a desired integer of 2 or more) block, and that outputs multi-channel reduced image signals with a reduction ratio 1/n; and an inter-channel displacement correcting unit that corrects inter-channel displacements of the reduced image signals output by the pixel mixing and reading unit and that outputs corrected reduced image signals.

DESCRIPTION OF EMBODIMENTS

A solid-state image-capturing device 1 according to a first embodiment of the present invention will be described below with reference to the drawings.

The solid-state image-capturing device 1 of this embodiment generates, from a full-resolution Bayer-image signal, reduced three-plane image signals whose vertical and horizontal sizes are reduced to (1/even number). Here, a description will be given of a case in which the vertical and horizontal sizes are reduced to ¼. In general, the actual size of an image that is vertically and horizontally reduced to 1/n becomes $1/n^2$; however, in the explanation of this embodiment, unless otherwise stated, 1/n reduction means that the vertical and horizontal sizes are reduced to 1/n.

Figure 1:
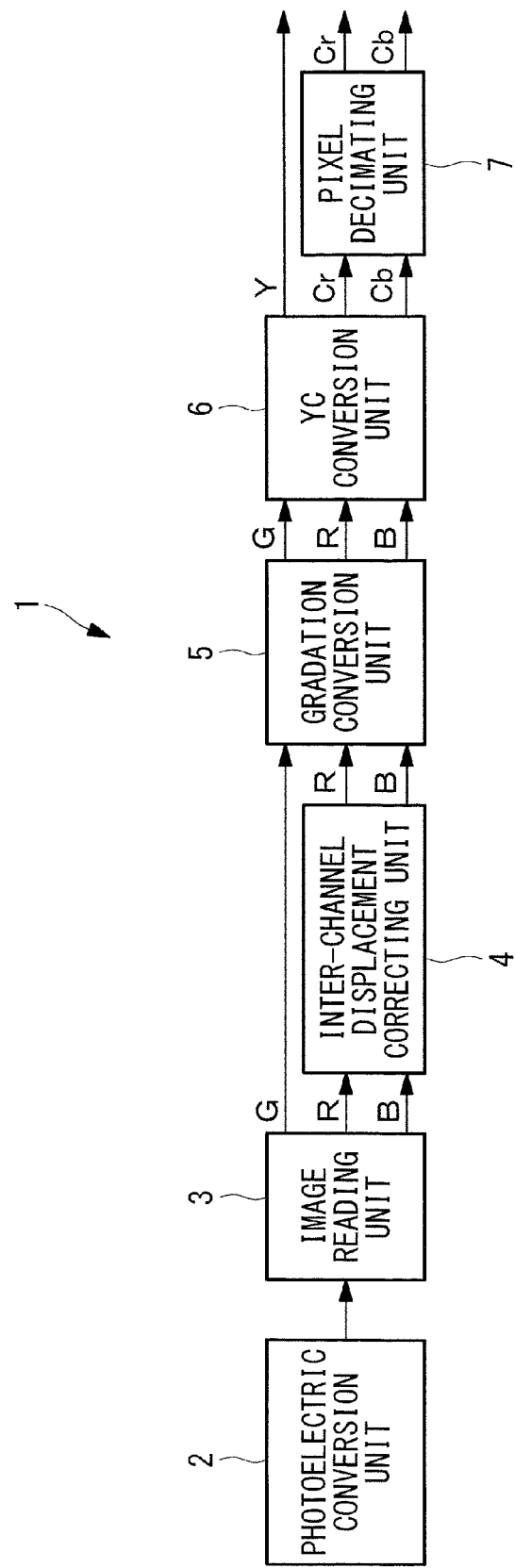
FIG. 1 is a block diagram showing a solid-state image-capturing device according to a first embodiment of the present invention.

As shown in FIG. 1, the solid-state image-capturing device 1 of this embodiment is provided with: a photoelectric conversion unit 2 in which Bayer-arrayed pixels having a plurality of colors are two-dimensionally arrayed, vertically and horizontally, and that converts light entering each of the pixels into an electrical signal; an image reading unit (pixel mixing and reading unit) 3 that reads pixel signals formed of electrical signals obtained in the photoelectric conversion unit 2, that mixes the pixel signals for the respective colors, and that outputs multi-channel reduced image signals; an inter-channel displacement correcting unit 4 that corrects inter-channel position displacements of the reduced image signals output from the image reading unit 3; a gradation conversion unit 5 that subjects the corrected reduced image signals to gradation conversion, such as gamma correction; a YC conversion unit (color conversion unit) 6 that separates the reduced image signals output from the gradation conversion unit 5 into a brightness signal and color-difference signals; and a pixel decimating unit 7 that reduces the amount of data by decimating the color-difference signals obtained through conversion in the YC conversion unit 6.

Figure 2:
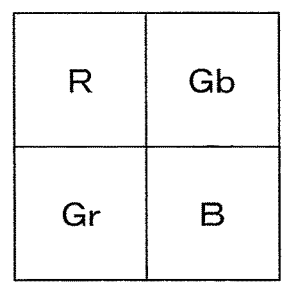
FIG. 2 is a view showing a pixel array in a photoelectric conversion unit of the solid-state image-capturing device shown in FIG. 1.
Figure 3:
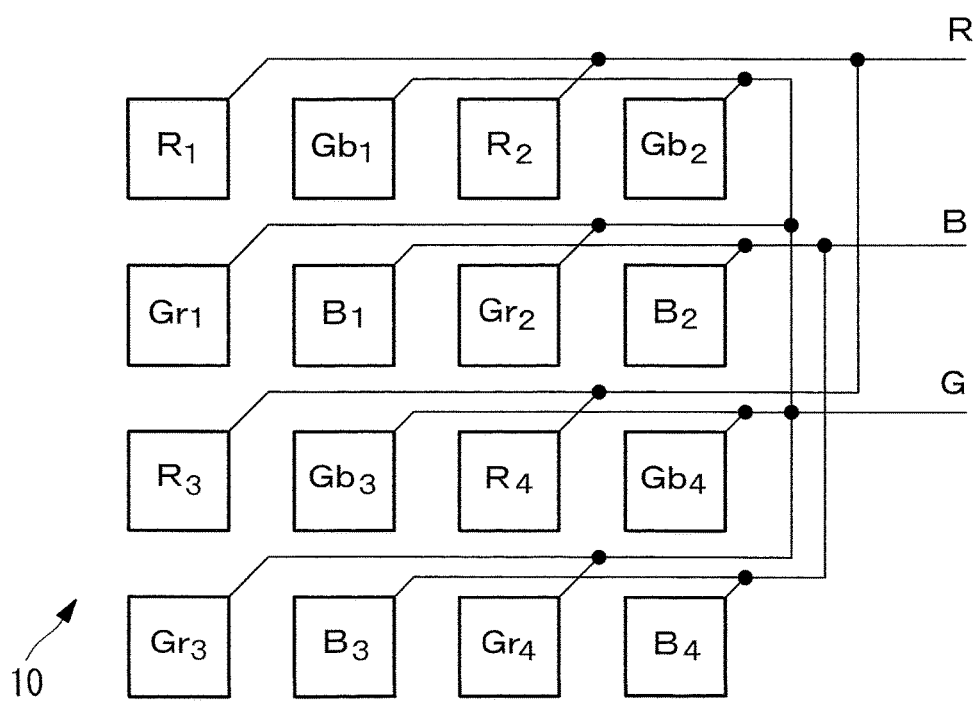
FIG. 3 is a view for explaining a block read by an image reading unit of the solid-state image-capturing device shown in FIG. 1.
Figure 4:
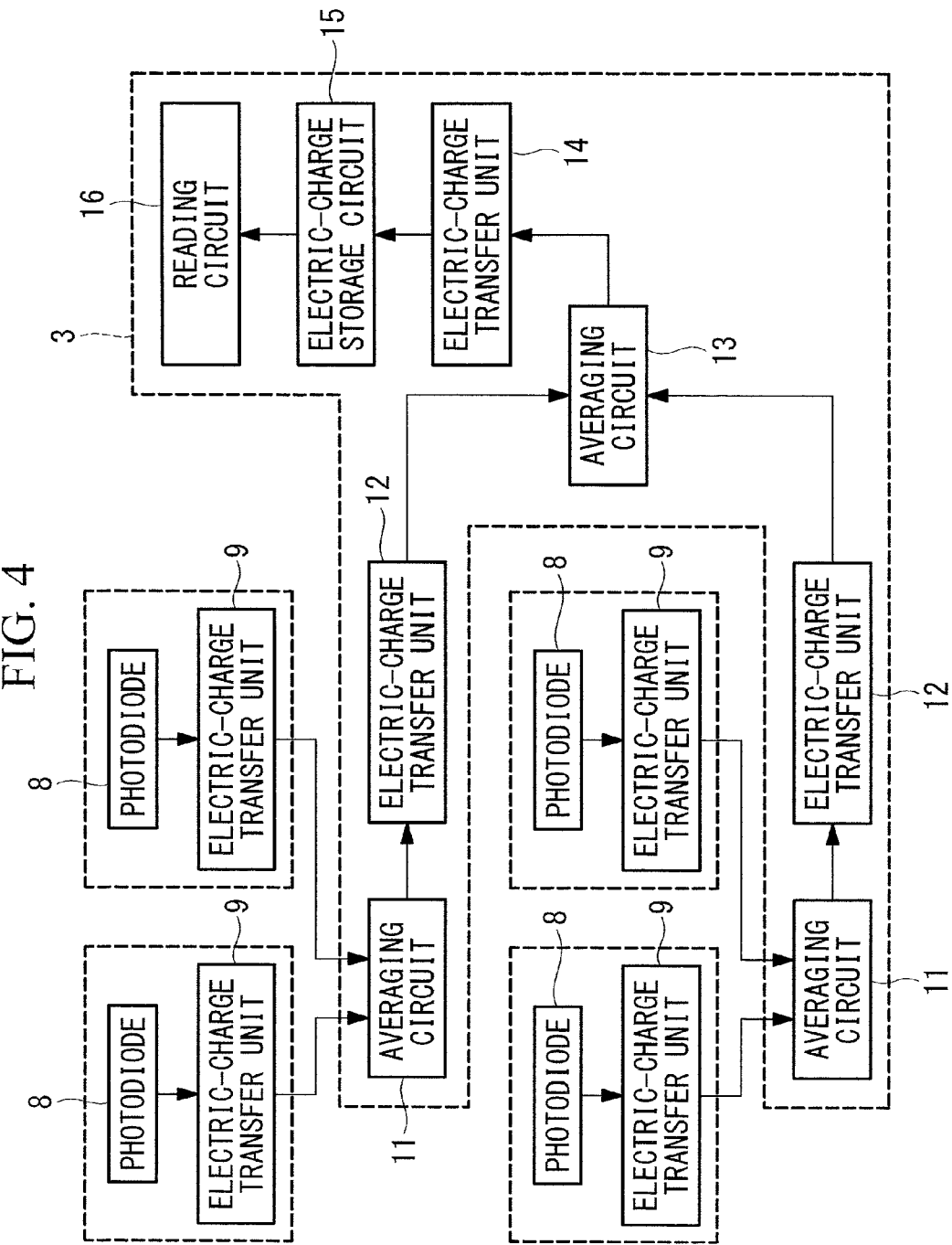
FIG. 4 is a block diagram for explaining the photoelectric conversion unit and the image reading unit of the solid-state image-capturing device shown in FIG. 1.

The photoelectric conversion unit 2 is formed by two-dimensionally arraying, as shown in FIG. 3, Bayer-arrayed sets of R-channel pixels, Gr-channel pixels, Gb-channel pixels, and B-channel pixels, as shown in FIG. 2. As shown in FIG. 4, each pixel is provided with a photodiode 8 that photoelectrically converts incident light and an electric-charge transfer unit 9 that transfers an electric charge output from the photodiode 8.

The image reading unit 3 mixes image signals of pixels having the same colors for each 4×4 pixel area (block) 10 of a full-resolution Bayer image, as shown in FIG. 3, for example, and outputs reduced image signals of three channels (three planes) for R, G, and B. Each block 10 includes four R-channel pixels $R_1$, $R_2$, $R_3$, and $R_4$, eight G-channel pixels $Gr_1$, $Gr_2$, $Gr_3$, $Gr_4$, $Gb_1$, $Gb_2$, $Gb_3$, and $Gb_4$, and four B-channel pixels $B_1$, $B_2$, $B_3$, and $B_4$.

Here, a description will be given of an example mixture of image signals from the four R-channel pixels $R_1$, $R_2$, $R_3$, and $R_4$. The four R-channel pixels $R_1$, $R_2$, $R_3$, and $R_4$ in the block 10 shown in FIG. 3 correspond to photodiodes shown in FIG. 4. The image reading unit 3 is provided with: averaging circuits 11 that are each provided for two pixels and that each average electric charges transferred from the two electric-charge transfer units 9; electric-charge transfer units 12 that each transfer the electric charge averaged by the corresponding averaging circuit 11; an averaging circuit 13 that is provided for four pixels and that averages the electric charges transferred from the two electric-charge transfer units 12; an electric-charge transfer unit 14 that transfers the electric charge output from the averaging circuit 13; an electric-charge storage circuit 15 that stores the electric charge transferred from the electric-charge transfer unit 14; and a reading circuit 16 that reads an electric-charge signal from the electric-charge storage circuit 15.

The electric-charge signal read by the reading circuit 16 is converted to a voltage signal at a floating diffusion amplifier (not shown) and is further converted to a digital image signal by an A/D converter (not shown).

The inter-channel displacement correcting unit 4 is a position-displacement correcting unit that corrects position displacements such that the coordinates of the R-channel reduced image signal and the coordinates of the B-channel reduced image signal are made coincident with the coordinates of the G-channel reduced image signal, each of the image signals being obtained after mixing and reading by the image reading unit 3.

Figure 5:
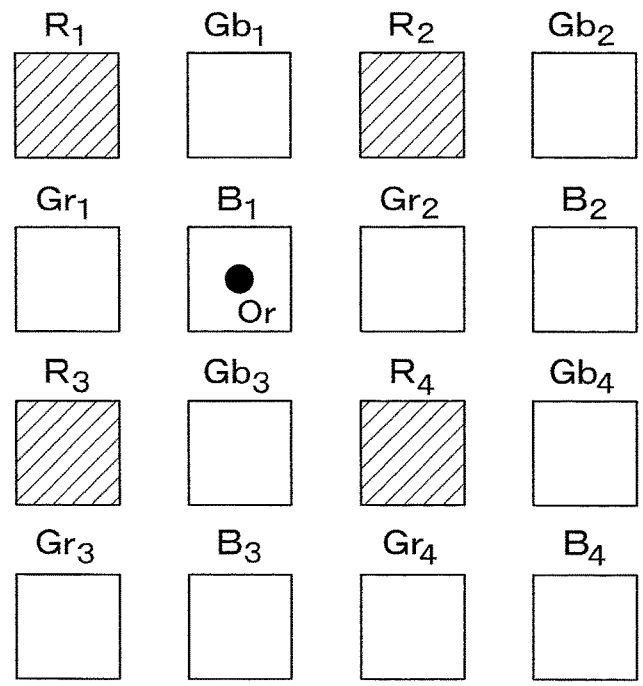
FIG. 5 is a view showing R-channel pixels and a center-of-gravity position thereof in the block shown in FIG. 3.

Specifically, as shown in FIG. 5, because the four R-channel pixels $R_1$, $R_2$, $R_3$, and $R_4$ in the block 10 shown in FIG. 3 are located at an upper left side in the block, a mixed output of the pixels $R_1$, $R_2$, $R_3$, and $R_4$ is output as a reduced image signal having coordinates at the center-of-gravity position Or thereof. In this case, the center-of-gravity position Or is coincident with the coordinates of the pixel $B_1$, which is located at the second column from the left and the second row from the top.

Figure 7:
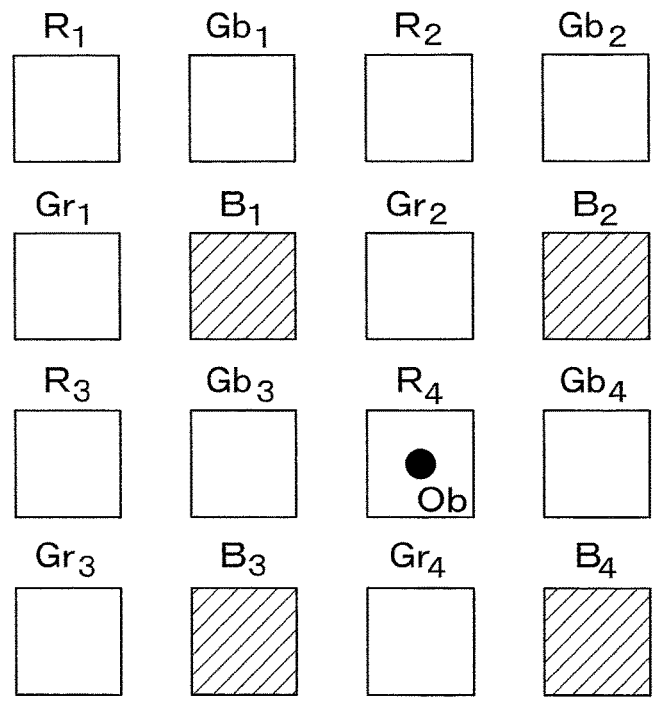
FIG. 7 is a view showing B-channel pixels and a center-of-gravity position thereof in the block shown in FIG. 3.

As shown in FIG. 7, because the four B-channel pixels $B_1$, $B_2$, $B_3$, and $B_4$ in the block 10 shown in FIG. 3 are located at a lower right side in the block, a mixed output of the pixels $B_1$, $B_2$, $B_3$, and $B_4$ is output as a reduced image signal having coordinates at the center-of-gravity position Ob thereof. In this case, the center-of-gravity position Ob is coincident with the coordinates of the pixel $B_4$, which is located at the second column from the right and the second row from the bottom.

Figure 6:
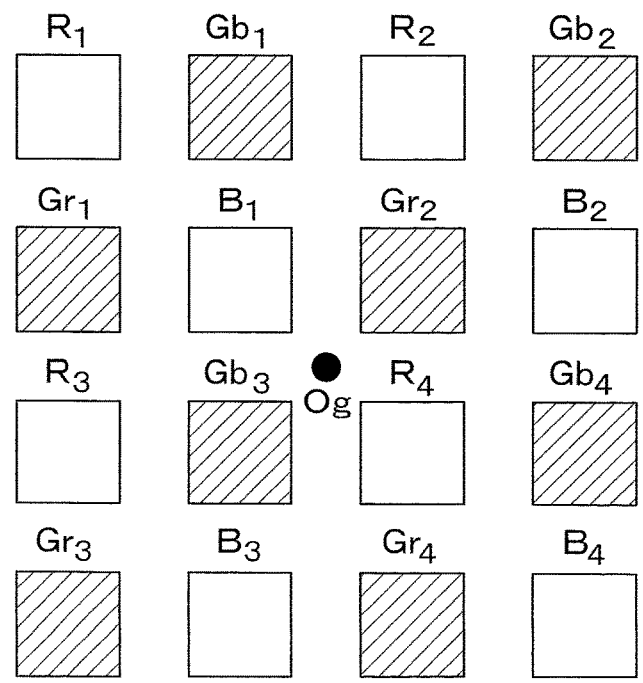
FIG. 6 is a view showing G-channel pixels and a center-of-gravity position thereof in the block shown in FIG. 3.

On the other hand, as shown in FIG. 6, the center-of-gravity position Og of the eight G-channel pixels $Gr_1$, $Gr_2$, $Gr_3$, $Gr_4$, $Gb_1$, $Gb_2$, $Gb_3$, and $Gb_4$ in the block 10 shown in FIG. 3 is coincident with the center position of the block 10.

Figure 8:
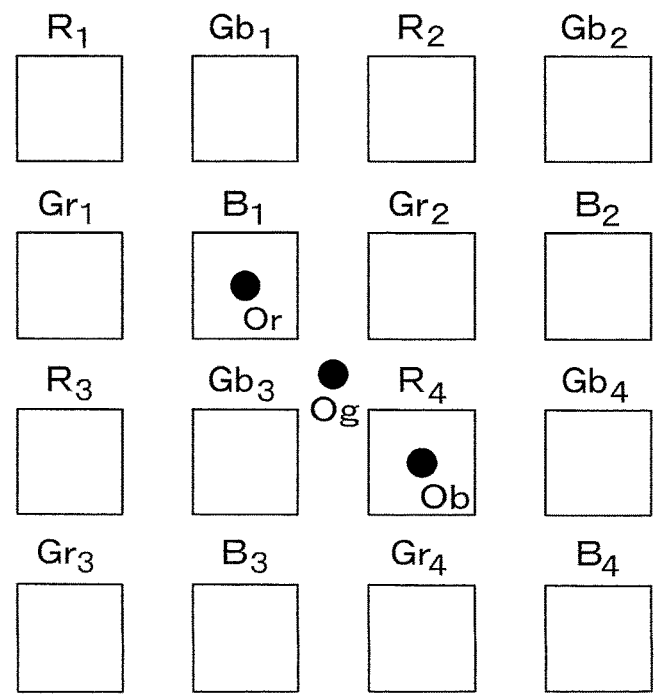
FIG. 8 is a view for explaining displacements in the center-of-gravity position among the different channel pixels shown in FIGS. 5 to 7.

Therefore, the G-channel reduced image signal is output as a signal having coordinates at the center position of the block 10; however, as shown in FIG. 8, the R-channel and B-channel reduced image signals have coordinates displaced from the coordinates of the G-channel reduced image signal by $1/(2n)$ pixels obliquely upward and obliquely downward.

The inter-channel displacement correcting unit 4 corrects such position displacements and subjects the R-channel and B-channel reduced image signals to four-point interpolation according to Formula 1.

$$R'(i,j)=a*(a*R(i-b,j-b)+b*R(i-b,j+a))+b*(a*R(i+a,j-b)+b*R(i+a,j+a))$$

$$B'(i,j)=b*(a*B(i-a,j-a)+a*B(i-a,j+b))+a*(b*R(i+b,j-a)+a*R(i+b,j+b))$$ {Formula 1}

In Formula 1, the coordinates (i, j) show the coordinates at which a G-channel pixel exists. The coordinates at four points (i−b, j−b), (i−b, j+a), (i+a, j−b), and (i+a, j+a) show coordinates at which R-channel or B-channel pixels that are nearest neighbors to the coordinates (i, j) exist. This calculation can be realized by using a line memory and some arithmetic units.

Note that processing performed in the units located at subsequent stages of the inter-channel displacement correcting unit 4 is performed for digital image signals, and calculation is performed at a logic circuit installed in the solid-state image-capturing device 1.

The gradation conversion unit 5 subjects each of input RGB-channel reduced image signals to gradation conversion, which is represented by gamma correction etc., and then reduces the bit precision of the image signals to some extent (for example, compresses from a bit precision of 12 bits after A/D conversion to 8 bits), thereby reducing the amount of data.

The YC conversion unit 6 converts the RGB-channel image signals obtained after gradation conversion at the gradation conversion unit 5, into a brightness signal (Y) and color-difference signals (Cb/Cr). A general conversion equation conforming to the ITU-R BT.601 system is indicated by Formula 2.

$$\begin{pmatrix} Y \\ Cb \\ Cr \end{pmatrix} = \begin{pmatrix} 0.299 & 0.587 & 0.114 \\ -0.169 & -0.331 & 0.5 \\ 0.5 & -0.419 & -0.081 \end{pmatrix} \begin{pmatrix} R \\ G \\ B \end{pmatrix} \quad \{Formula\ 2\}$$

Figure 9A:
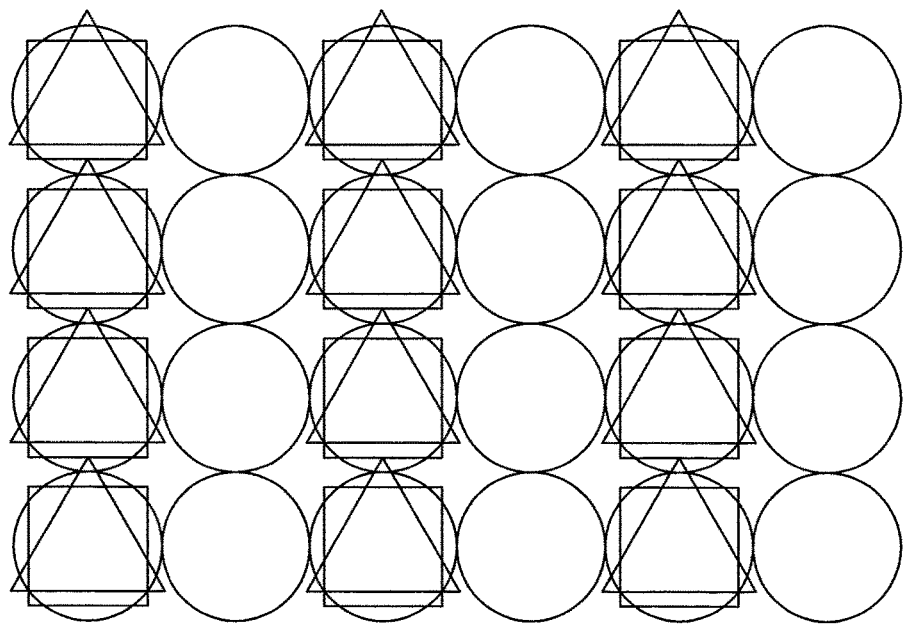
FIG. 9A is a view for explaining the amounts of decimation in a 4:2:2 format decimated by a pixel decimating unit of the solid-state image-capturing device shown in FIG. 1.
Figure 9B:
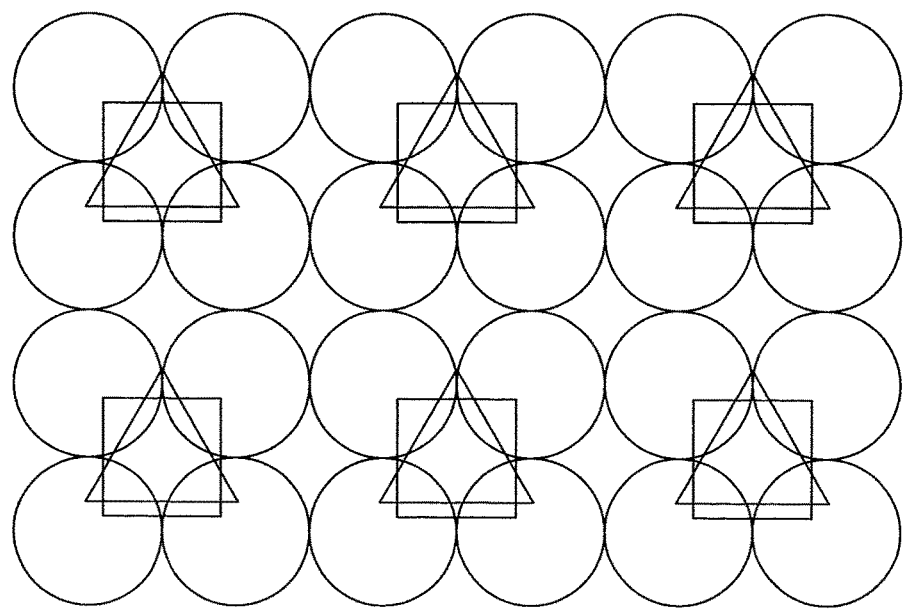
FIG. 9B is a view for explaining the amounts of decimation in a 4:2:0 format decimated by a pixel decimating unit of the solid-state image-capturing device shown in FIG. 1.

The pixel decimating unit 7 decimates the color-difference signals (Cb/Cr), which are obtained through conversion at the YC conversion unit 6, at predetermined intervals to reduce the amount of data. For the amount of decimation, there are typical formats, e.g., the 4:2:2 format (when the Y signal is 1, the Cb/Cr signal is ½), as shown in FIG. 9A, and the 4:2:0 format (when the Y signal is 1, the Cb/Cr signal is ¼), as shown in FIG. 9B. In the figures, a circular sign denotes a Y signal, a square sign denotes a Cb signal, and a triangle sign denotes a Cr signal.

Table 1 shows the amounts of data of intermediate outputs and final outputs with respect to respective reduction ratios, when the number of full-resolution pixels is 36,000,000 pixels (36 megapixels). Here, it is assumed that the bit precision at the time of reading is 12 bits, and that of an output of the gradation conversion unit is 8 bits.

TABLE 1

| | | AMOUNT OF DATA (Mbit) | | | | |
|---|---|---|---|---|---|---|
| reduction ratio | number of pixels (Mpixel) | [A] Bayer reading 12 bit Bayer | [B] three planes reading 12 bit RGB | [C] FIG. 1: 1003 output 8 bit RGB | [D] FIG. 1: final output 8 bit Y Cb Cr (4:2:2) | [E] FIG. 1: final output 8 bit Y Cb Cr (4:2:0) |
| 1 | 36.00 | 432 | — | — | — | — |
| 1/2 | 9.00 | 108 | 324 | 216 | 144 | 108 |
| 1/3 | 4.00 | 48 | 144 | 96 | 64 | 48 |
| 1/4 | 2.25 | 27 | 81 | 54 | 36 | 27 |
| 1/5 | 1.44 | 17 | 52 | 35 | 23 | 17 |

In Table 1, the amount of data output by the solid-state image-capturing device 1 of this embodiment is shown in column D (in the case of the 4:2:2 format) or column E (in the case of the 4:2:0 format), and it is found that high-resolution three-plane image signals can be transferred with the amount of data equivalent to the amount of data (column A) of a reduced Bayer image.

In this way, with the solid-state image-capturing device 1 of this embodiment, multi-channel reduced image signals are output instead of a reduced Bayer image; therefore, an advantageous effect is afforded in that cutting of reproducible frequency bands, which conventionally occurs as a result of reconstructing the reduced Bayer image, does not occur, thus making it possible to reproduce a high-definition image while reducing the amount of data to be transferred. Furthermore, there is an advantage that it is possible to reduce the amount of data output from the gradation conversion unit 5 and to decimate color-difference signals, which are less recognized by human vision, at the YC conversion unit 6 and the pixel decimating unit 7, thus reducing the amount of data while suppressing a change in the image.

According to the first embodiment, light from a subject incident on the photoelectric conversion unit is subjected to photoelectric conversion for each of pixels that are periodically color-arrayed, thus being converted into electrical image signals, the obtained image signals are mixed, at the pixel mixing and reading unit, in each of the pixels of the same colors in the n×n block, and multi-channel reduced image signals with a reduction ratio 1/n are output. Because the multi-channel reduced image signals, which are obtained after mixing for the respective colors, have displacements corresponding to the color arrays of the pixels, the displacements are corrected at the inter-channel displacement correcting unit, thereby making it possible to output multi-channel reduced image signals with no displacements. Because the multi-channel reduced image signals are output, instead of a reduced Bayer image, cutting of reproducible frequency bands, which conventionally occurs as a result of reconstructing the reduced Bayer image, does not occur, thus making it possible to reproduce a high-definition image while reducing the amount of data to be transferred.

When the block, in which pixel signals are mixed by the pixel mixing and reading unit, has an even number of pixels, the image signals acquired at the Bayer-arrayed pixels of the photoelectric conversion unit are displaced in the center-of-gravity position of the pixels of the same color in the block between colors. According to this aspect, the position-displacement correcting unit of the inter-channel displacement correcting unit corrects the position displacement, thereby making it possible to output multi-channel reduced image signals whose coordinates are made coincident.

Next, a solid-state image-capturing device 20 according to a second embodiment of the present invention will be described below with reference to the drawings.

In the description of this embodiment, identical signs are assigned to configurations common to those of the above-described solid-state image-capturing device 1 of the first embodiment, and a description thereof will be omitted.

The solid-state image-capturing device 20 of this embodiment outputs, from a full-resolution Bayer image, a reduced three-plane image whose vertical and horizontal sizes are reduced to (1/odd number). A description will be given below of an example case in which the horizontal and vertical sizes are basically reduced to ⅕.

Figure 10:
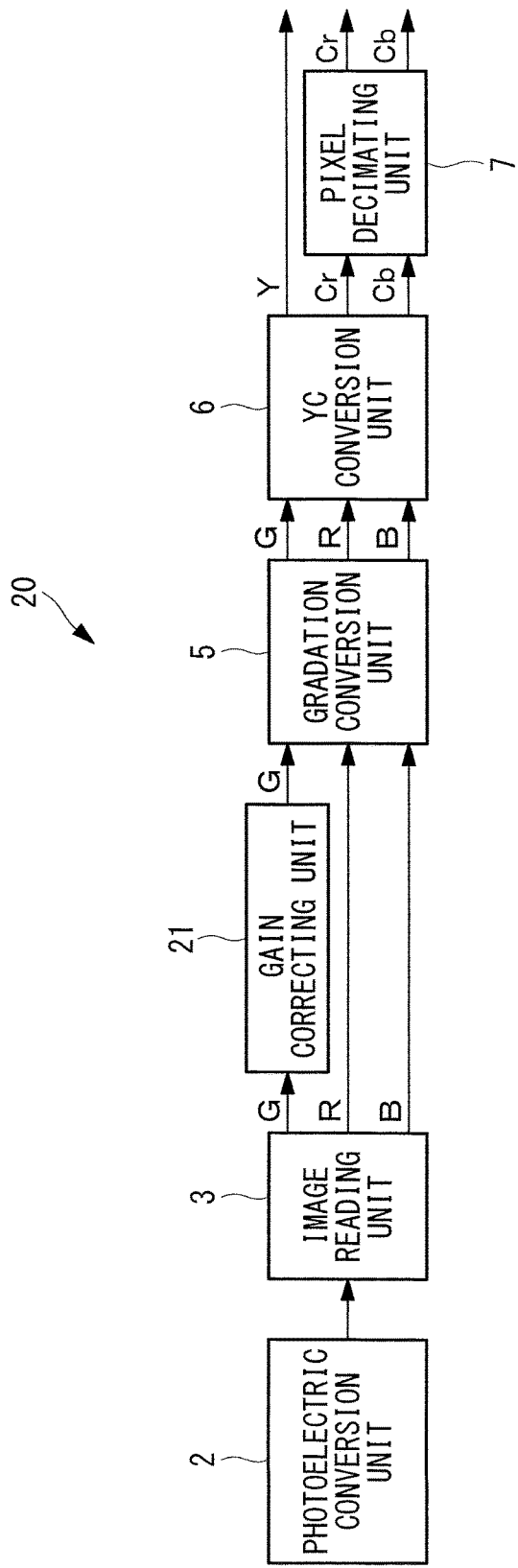
FIG. 10 is a block diagram showing a solid-state image-capturing device according to a second embodiment of the present invention.

As shown in FIG. 10, the solid-state image-capturing device 20 of this embodiment differs from the solid-state image-capturing device 1 of the first embodiment in that a gain correcting unit (specific-channel gain correcting unit) 21 is provided instead of the inter-channel displacement correcting unit 4.

The gain correcting unit 21 multiplies a G-channel reduced image signal, of reduced image signals that are each obtained after mixing and reading by the image reading unit 3, by a gain.

The image reading unit 3 mixes image signals of pixels having the same colors for each 5×5 pixel area (block) 22 of a full-resolution Bayer image, as shown in FIGS. 11A to 11D, for example, and outputs reduced image signals of three channels (three planes), i.e., R, G, and B. Each block 22 includes four, six, or nine R-pixels, twelve or thirteen G-pixels, and four, six, or nine B-pixels. Then, the block 22 can have four mixture patterns, as shown in FIGS. 11A to 11D, depending on how the block is cut.

In the case of this embodiment, in any of the mixture patterns, the center-of-gravity positions of the R-channel pixel, the G-channel pixel, and the B-channel pixel are coincident with the center position of the 5×5 block 22; therefore, it is unnecessary to correct a position displacement of the center-of-gravity position, unlike the first embodiment. However, in the mixture patterns, in the G channel constituting the reduced image signals, the number of Gr pixels, which are G-channel pixels arrayed in R-G columns, and the number of Gb pixels, which are G-channel pixels arrayed in B-G columns, are different.

Figure 11A:
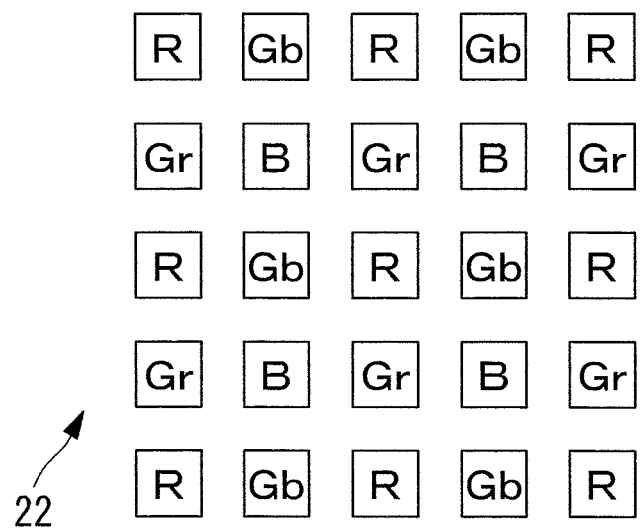
FIG. 11A is a view for explaining first mixture patterns in blocks read by an image reading unit of the solid-state image-capturing device shown in FIG. 10.
Figure 11B:
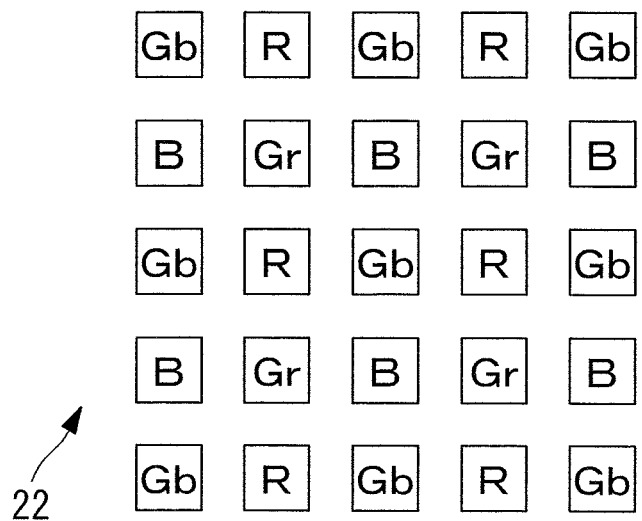
FIG. 11B is a view for explaining second mixture patterns in blocks read by an image reading unit of the solid-state image-capturing device shown in FIG. 10.
Figure 11C:
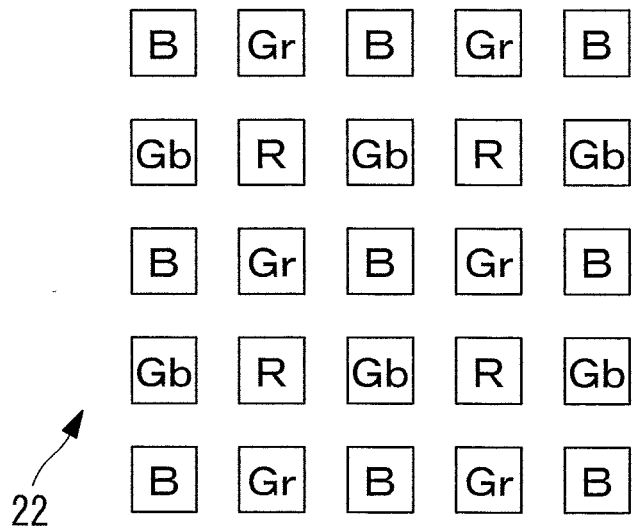
FIG. 11C is a view for explaining third mixture patterns in blocks read by an image reading unit of the solid-state image-capturing device shown in FIG. 10.
Figure 11D:
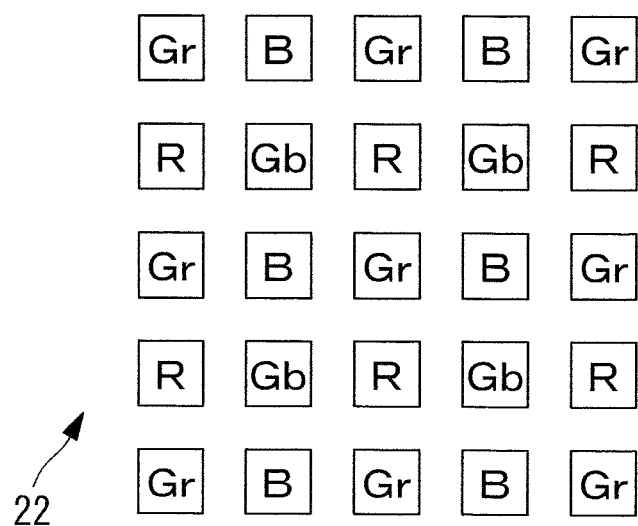
FIG. 11D is a view for explaining fourth mixture patterns in blocks read by an image reading unit of the solid-state image-capturing device shown in FIG. 10.
Figure 12:
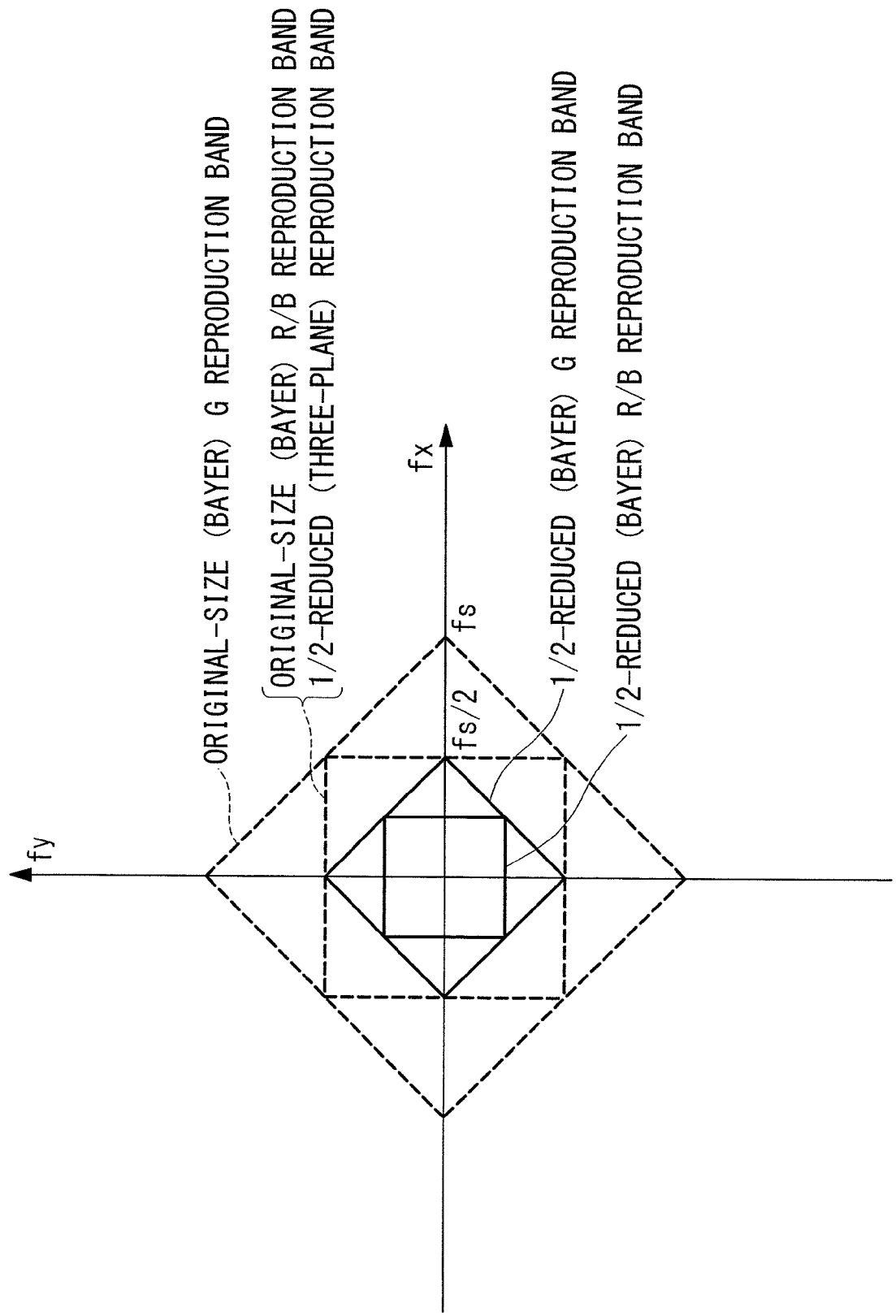
FIG. 12 is a graph for explaining reproduction bands of various reduced image signals.

Specifically, the mixture patterns shown in FIGS. 11A and 11C include six Gr pixels and six Gb pixels, the mixture pattern shown in FIG. 11B includes four Gr pixels and nine Gb pixels, and the mixture pattern shown in FIG. 11D includes nine Gr pixels and four Gb pixels.

In a general Bayer-array solid-state image-capturing device, even when an image of a subject having uniform brightness and color components is acquired, mainly a green filter of Gr pixels arrayed in the R-G columns and a green filter of Gb pixels arrayed in the B-G columns have different spectral characteristics; thus, it is known that there is a case in which a difference is caused between an image signal obtained from the Gr pixels and an image signal obtained from the Gb pixels.

Thus, in this embodiment, the gain correcting unit calculates correction gains from the number of Gr pixels and that of Gb pixels and from coefficient based on the difference in spectral characteristics, and multiplies the reduced image signal read from the Gr pixels and the reduced image signal read from the Gb pixels by the different correction gains.

Accordingly, it is possible to suppress grid-like or striped noise caused by the difference in spectral characteristics between the green filters.

Specifically, also in the solid-state image-capturing device 1 of this embodiment, there is an advantage that it is possible to suppress noise by correcting inter-channel displacements of the reduced image signals and to output reduced three-plane image signals that can reproduce a high-resolution image, with the same amount of data as the amount of data of the reduced Bayer image, as shown in Table 1.

When the block, in which pixel signals are mixed by the pixel mixing and reading unit, has an odd number of pixels, the image signals acquired at the Bayer-arrayed pixels of the photoelectric conversion unit are not displaced in the center-of-gravity position of the pixels of the same color in the block between colors, but are displaced due to the difference in spectral characteristics between filters in two types of G channels. According to this aspect, the gain correcting unit of the inter-channel displacement correcting unit corrects a displacement of the spectral characteristics of the filters, thereby making it possible to output multi-channel reduced image signals with less noise.

Note that, in the above-described embodiments, a description has been given of a case in which one of the position correcting unit and the gain correcting unit is provided as the inter-channel displacement correcting unit; however, instead of this, it is possible to provide both of them and to select the position correcting unit or the gain correcting unit and use it depending on whether the number of pixels in a selected block is even or odd.

By doing so, irrespective of whether the number of pixels in the block, in which pixel signals are mixed by the pixel mixing and reading unit, is even or odd, it is possible to correct an inter-channel displacement of the reduced image signals by using the inter-channel displacement correcting unit and to output the corrected reduced image signals.

Furthermore, in this embodiment, a description has been given of the photoelectric conversion unit in which pixels of a plurality colors are Bayer-arrayed; however, the present invention is not limited thereto and can be applied to a configuration including a desired photoelectric conversion unit that is formed by arraying pixels of a plurality of colors having predetermined color-array periodicity in two-dimensionally, vertically and horizontally.

Furthermore, although a description has been given of cases of reduction ratios of 1/4 and 1/5, instead of them, the present invention can be applied to cases of desired reduction ratios of 1/even number and 1/odd number.

REFERENCE SIGNS LIST 1, 20 solid-state image-capturing device
2 photoelectric conversion unit
3 pixel mixing and reading unit (image reading unit)
4 position correcting unit (inter-channel displacement correcting unit)
5 gradation conversion unit
6 YC conversion unit (color conversion unit)
7 pixel decimating unit
10, 22 block
21 gain correcting unit (inter-channel displacement correcting unit)

The invention claimed is:

1. A solid-state image-capturing device comprising:
a photoelectric converter that is formed by arraying pixels of a plurality of colors vertically and horizontally, the pixels having predetermined color-array periodicity two-dimensionally;
pixel mixing and reading circuitry that mixes pixel signals obtained by the photoelectric converter, for pixels with a same color in an n×n block (n denotes a desired integer of 2 or more), and that outputs multi-channel reduced image signals with a reduction ratio of 1/n; and
inter-channel displacement correcting circuitry that corrects inter-channel displacements of the reduced image signals output by the pixel mixing and reading circuitry and that outputs corrected reduced image signals;
wherein:
the photoelectric converter is formed by Bayer-arraying the pixels;
the pixel mixing and reading circuitry calculates a mixed pixel signal for pixels with the same color as the reduced image signal, each reduced image signal having a coordinate located at a center-of-gravity position of the pixels with the same color in the block;
the multi-channel reduced image signals output by the pixel mixing and reading circuitry include a R-channel, a B-channel and a G-channel reduced image signal;
the R-channel and the B-channel reduced image signals have coordinates displaced from a coordinate of the G-channel reduced image signal by 1/(2n) pixels obliquely upward and obliquely downward, respectively; and
the inter-channel displacement correcting circuitry comprises a position-displacement correcting circuit that corrects, when n is an even number, coordinate displacements of the R-channel and B-channel reduced image signals such that the coordinates thereof coincide with the coordinate of the G-channel reduced image signal, wherein the inter-channel displacement correcting circuitry corrects the coordinate displacements by interpolating only the R-channel and B-channel reduced image signals, respectively.

2. The solid-state image-capturing device according to claim 1, wherein:
the inter-channel displacement correcting circuitry further comprises a gain correcting circuit that corrects, when n is an odd number, a difference in characteristics of the pixels of the same color between adjacent rows.

3. The solid-state image-capturing device according to claim 1, further comprising:
a color conversion circuit that separates the multi-channel reduced image signals corrected by the inter-channel displacement correcting circuitry into a brightness signal and color-difference signals and that limits signal bands of the color-difference signals; and
a pixel decimating circuit that decimates the color-difference signals output from the color conversion circuit.

4. The solid-state image-capturing device according to claim 1, further comprising a gradation conversion circuit that performs gradation conversion on the multi-channel reduced image signals corrected by the inter-channel displacement correcting circuitry and that outputs image signals that are expressed by a bit width less than a bit width obtained after A/D conversion.

5. A solid-state image-capturing device comprising:
pixel mixing and reading circuitry that mixes pixel signals obtained by a photoelectric converter formed by arraying pixels of a plurality of colors vertically and horizontally, the pixels having predetermined color-array periodicity two-dimensionally, the pixel mixing and reading circuitry mixing the pixel signals for pixels of a same color in an n×n block (n denotes a desired integer greater of 2 or more), and outputting multi-channel reduced image signals with a reduction ratio of 1/n; and
inter-channel displacement correcting circuitry that corrects inter-channel displacements of the reduced image signals output by the pixel mixing and reading circuitry and that outputs corrected reduced image signals;
wherein:
the photoelectric converter is formed by Bayer-arraying the pixels;
the pixel mixing and reading circuitry calculates a mixed pixel signal for pixels with the same color as the reduced image signal, each reduced image signal having a coordinate located at a center-of-gravity position of the pixels with the same color in the block;
the multi-channel reduced image signals output by the pixel mixing and reading circuitry include a R-channel, a B-channel and a G-channel reduced image signal;

the R-channel and the B-channel reduced image signals have coordinates displaced from a coordinate of the G-channel reduced image signal by 1/(2n) pixels obliquely upward and obliquely downward, respectively; and the inter-channel displacement correcting circuitry comprises a position-displacement correcting circuit that corrects, when n is an even number, coordinate displacements of the R-channel and B-channel reduced image signals such that the coordinates thereof coincide with the coordinate of the G-channel reduced image signal, wherein the inter-channel displacement correcting circuitry corrects the coordinate displacements by interpolating only the R-channel and B-channel reduced image signals, respectively.

* * * * *